(12) United States Patent
Dolle et al.

(10) Patent No.: US 7,521,104 B2
(45) Date of Patent: Apr. 21, 2009

(54) MOLDING COMPOSITIONS MADE FROM A HIGH-MOLECULAR-WEIGHT-PROPYLENE POLYMER

(75) Inventors: Volker Dolle, Bensheim (DE); Thomas Böhm, Darmstadt (DE); Herbert Terwyen, Hochheim (DE)

(73) Assignee: Basell Poliolefine Italia s.r.l., Milan (IT)

( * ) Notice: Subject to any disclaimer, the term of this patent is extended or adjusted under 35 U.S.C. 154(b) by 147 days.

(21) Appl. No.: 10/539,343

(22) PCT Filed: Dec. 19, 2003

(86) PCT No.: PCT/EP03/14650
§ 371 (c)(1),
(2), (4) Date: Jan. 9, 2006

(87) PCT Pub. No.: WO2004/056922
PCT Pub. Date: Jul. 8, 2004

(65) Prior Publication Data
US 2006/0167141 A1    Jul. 27, 2006

(30) Foreign Application Priority Data
Dec. 20, 2002 (DE) ............................ 102 61 107

(51) Int. Cl.
F16L 9/12 (2006.01)
C08K 5/3465 (2006.01)
C08L 23/10 (2006.01)
B29D 23/00 (2006.01)

(52) U.S. Cl. ................... 428/36.9; 428/36.92; 524/242; 524/583; 524/579

(58) Field of Classification Search ................. 526/351; 528/396; 524/89, 87, 90, 242, 583; 428/36.9, 428/36.92
See application file for complete search history.

(56) References Cited

U.S. PATENT DOCUMENTS

| | | | |
|---|---|---|---|
| 4,138,520 A | 2/1979 | Sato et al. | 428/141 |
| 4,857,613 A | 8/1989 | Zolk et al. | 526/128 |
| 5,288,824 A | 2/1994 | Kerth et al. | 526/128 |
| 5,310,584 A * | 5/1994 | Jacoby et al. | 428/2 |
| 5,681,922 A * | 10/1997 | Wolfschwenger et al. | 528/486 |
| 5,962,595 A | 10/1999 | Dolle et al. | 525/322 |
| 2003/0008091 A1 * | 1/2003 | Konrad et al. | 428/36.9 |
| 2004/0157019 A1 * | 8/2004 | McGoldrick et al. | 428/35.7 |
| 2004/0157969 A1 * | 8/2004 | McGoldrick et al. | 524/210 |
| 2004/0158002 A1 * | 8/2004 | McGoldrick et al. | 525/245 |
| 2004/0170790 A1 * | 9/2004 | Ek et al. | 428/36.91 |
| 2005/0053741 A1 | 3/2005 | Ebner et al. | |

FOREIGN PATENT DOCUMENTS

| | | |
|---|---|---|
| DE | 40 19 053 | 12/1991 |
| DE | 195 29 240 | 2/1997 |
| EP | 0 045 975 | 2/1982 |
| EP | 0 045 977 | 2/1982 |
| EP | 0 086 473 | 8/1983 |
| EP | 177 961 A2 * | 10/1985 |
| EP | 0 171 200 | 2/1986 |
| EP | 0 177 961 | 4/1986 |
| EP | 278 470 A2 * | 2/1988 |
| EP | 660 024 A1 * | 12/1994 |
| EP | 0 808 870 | 11/1997 |
| EP | 0 877 039 | 11/1998 |
| EP | 962 489 A2 * | 12/1999 |
| EP | 1 26-546 A1 * | 11/2002 |
| EP | 1 260 528 A1 * | 11/2002 |
| EP | 1 260 529 A1 * | 11/2002 |
| EP | 1 260 545 | 11/2002 |
| EP | 1 260 545 A1 * | 11/2002 |
| EP | 1 312 623 A1 * | 5/2003 |
| EP | 1448631 | 1/2006 |
| GB | 2 111 065 | 6/1983 |
| JP | 49-98478 * | 9/1974 |
| JP | 09-291114 | 11/1997 |
| JP | 9-291114 * | 11/1997 |

OTHER PUBLICATIONS

Moos et al. Die Angewandte Makromolekulare Chemie, 1981, 213-225, 213-225.*
JP 9-291114 (Nov. 1997) abstract and translation in English.*
Moos et al., Die Angewandte Makromolekulare Chemie *Nucleation and Polymorphism in Isotactic Polypropylene*, vol. 94, pp. 213-225, 1981 (includes translation).

* cited by examiner

*Primary Examiner*—Vasu Jagannathan
*Assistant Examiner*—Rip A. Lee
(74) *Attorney, Agent, or Firm*—Jarrod N. Raphael

(57) ABSTRACT

Molding compositions made from a high-molecular-weight propylene polymer with a melt mass-flow rate MFR of from 0.3 to 1 g/10 min, to ISO 1133 at 230° C. and 5 kg, and with a proportion of β modification crystallites in the range from 2 to 20% by weight. The molding compositions of the invention preferably comprise a quinarcidone pigment as nucleating agent. The high-molecular-weight propylene polymer used preferably comprises a high-molecular-weight propylene copolymer with up to 30% by weight of other copolymerized olefins having up to 10 carbon atoms. One of the uses of the molding compositions of the invention is as materials for pipes.

25 Claims, No Drawings

MOLDING COMPOSITIONS MADE FROM A HIGH-MOLECULAR-WEIGHT-PROPYLENE POLYMER

The present invention relates to molding compositions made from a high-molecular-weight propylene polymer with a melt mass-flow rate MFR of from 0.3 to 1 g/10 min, to ISO 1133 at 230° C. and 5 kg, and with a proportion in the range from 2 to 20% by weight of β modification crystallites.

The present invention further relates to a process for preparing the molding compositions of the invention, to their use as materials for pipes, and also to pipes made from the molding compositions of the invention.

Propylene polymers may be prepared by liquid-phase polymerization, or else by polymerization in the monomer (bulk phase polymerization), or in a suspension (slurry), or by gas-phase polymerization. The polymerization here is carried out with the aid of a Ziegler-Natta catalyst system which is usually composed of a titanium-containing solid component, of an organic aluminum compound, and of an organic silane compound (EP-B 45 977, EP-A 171 200, U.S. Pat. Nos. 4,857,613, 5,288,824). However, propylene polymers may also be obtained with the aid of metallocene compounds, or of metal complexes having polymerization activity.

Examples of products obtained from propylene polymers are moldings, such as pipes, fittings, blow moldings, rods, and sheets.

These industrially useful propylene polymers have an isotactic structure. It is known that isotactic polypropylene can crystallize in a number of crystal modifications. The modification most frequently encountered is the monoclinic α modification. The hexagonal β modification can also occur in various proportions together with the α modification, and the proportion of β modification crystallites can in particular be increased by adding specific nucleating agents (K. H. Moos, B. Tilger, Angewandte Makromolekulare Chemie 94 (1981), pp. 213-225). EP-A 177 961 teaches that polypropylenes with a proportion in the range from 40 to 60% of β modification crystallites can be obtained using the gamma phase of linear trans-quinacridone as nucleating agent, and polypropylenes with a proportion of more than 70% of β modification crystallites are obtained by using mixed crystals of linear trans-quinacridone with quinacridone quinone.

DE-A 40 19 053 discloses propylene homopolymers with broad dispersity. These propylene homopolymers can also be used as materials for pipes. However, the resultant pipes are relatively brittle and have a rough surface, and therefore have no practical use.

EP-A 808 870 moreover describes high-molecular-weight copolymers of propylene with subordinate proportions of ethylene, and these can be processed using conventional production tooling to give pipes which have low brittleness together with a smooth surface and high toughness and stiffness, combined with good results in the long-term internal-hydrostatic-pressure test. However, when thick-walled polypropylene pipes (e.g. a pipe with an external diameter $d_a$ of 500 mm and a wall thickness s of 28.4 mm) are produced from this polypropylene, the requirements of DIN 8077 are not complied with in relation to the dimensional limits for the average external diameters, and the ovalities, and also the dimensional limits for the wall thicknesses. These pipes are non-circular with respect to their external diameters after production, and there is non-uniform wall thickness distribution. This type of pipe does not comply with the requirements of DIN 8077. It is unsuitable for the application.

It is an object of the present invention, therefore, to eliminate the disadvantages described and to develop new molding compositions which can be processed to give pipes which have a smooth surface, give very good results in the long-term internal-hydrostatic-pressure test, and have good impact strength, and whose dimensional stability complies with the dimensional limits for the average external diameters and the ovalities, and the dimensional limits for the wall thicknesses. The object of the present invention also includes a process with maximized simplicity and cost-effectiveness for preparing these molding compositions, and films, fibers, and moldings, in particular pipes, made from these molding compositions.

We have found that this object is achieved by means of molding compositions made from a high-molecular-weight propylene polymer with a melt mass-flow rate MFR of from 0.3 to 1 g/10 min, to ISO 1133 at 230° C. and 5 kg, and with a proportion in the range from 2 to 20% by weight of β modification crystallites.

The high-molecular-weight propylene polymer has a melt mass-flow rate MFR (230/5) of from 0.3 to 1 g/10 min, preferably from 0.6 to 0.9 g/10 min and particularly preferably from 0.75 to 0.9 g/10 min. This melt mass-flow rate MFR is the amount of polymer which is extruded within a period of 10 minutes from the test apparatus standardized to ISO 1133 at a temperature of 230° C. under a load of 5 kg. A melt mass-flow rate MFR (230/5) of from 0.3 to 1 g/10 min corresponds approximately to a melt mass-flow rate MFR (230/2.16) of from 0.1 to 0.3 g/10 min measured at a temperature of 230° C. under a load of 2.16 kg, but permits greater precision in differentiating between various polymers within the flowability range specified.

The proportion of β modification crystallites in the high-molecular-weight polypropylenes of the molding compositions of the invention is in the range from 2 to 20%, preferably from 2 to 10% by weight, and in particular from 4 to 8% by weight. The content of β modification crystallites is determined for the purposes of the invention by X-ray diffraction analysis. The Turner-Jones equation (A. Turner-Jones et al., Makromol. Chem. 75 (1964) 134)

$$k = \frac{H(300)_\beta}{H(300)_\beta + H(110)_\alpha + H(040)_\alpha + H(130)_\alpha}$$

is preferably used here to determine the k which gives the relative proportion of the crystalline β modification. $H(110)_\alpha$, $H(040)_\alpha$, and $H(130)_\alpha$ signify the height of the three marked peaks (110), (040), and (130) of the α modification, and $H(300)_\beta$ signifies the height of the marked peak (300) of the β modification. If the β modification is absent, the k value is zero, and if only the β modification is present in the material, the k value is 1.

In one embodiment of the present invention, the DSC crystallization onset for the molding composition of the invention to ISO 11357-1 is at a temperature above 122° C., and preferably below 130° C., particularly preferably from 123 to 129° C., most preferably from 123 to 127° C. When the range specified for the DSC crystallization onset is complied with, the resultant molding compositions have particularly advantageous properties.

The molding compositions of the invention also preferably comprise a quinacridone pigment, present in an amount of from 0.001 to 0.5% by weight, in particular from 0.002 to 0.2% by weight, and particularly preferably in an amount of from 0.002 to 0.1% by weight, based on the entire molding composition. It is particularly preferable here for the nucleating agent used to comprise the gamma phase of linear trans-quinacridone, marketed with the trade name PV Echtrot E3B or E5B from Clariant GmbH, Frankfurt.

The molding compositions of the invention may also comprise, inter alia, conventional additives, such as neutralizing agents, stabilizers, lubricants, fillers, or color pigments, in the usual amounts.

The molding compositions of the invention are obtainable by mixing and melting the high-molecular-weight propylene polymer with the quinacridone pigment, in a mixing apparatus at temperatures of from 180 to 320° C., preferably from 200 to 280° C., particularly preferably from 220 to 260° C. Mixing apparatuses which may be used here are in particular extruders or kneaders, particularly preferably twin-screw extruders. In the case of polymers which are in powder form, it is advantageous to premix the polymer with the nucleating agent and with other additives at room temperature in a mixing apparatus.

For reasons of appearance, it can also be advisable to add appropriate suitable color pigments to the molding compositions of the invention, to give these a desired RAL color number.

The high-molecular-weight propylene polymer used here can in particular comprise a high-molecular-weight propylene homopolymer, or else a high-molecular weight propylene copolymer with up to 30% by weight of other copolymerized olefins having up to 10 carbon atoms. These other olefins are in particular $C_2$-$C_{10}$ 1-alkenes, such as ethylene, 1-butene, 1-pentene, 1-hexene, 1-heptene, or 1-octene, preference being given to the use of ethylene or 1-butene or ethylene and 1-butene.

Particularly suitable materials in the molding compositions of the invention are homopolymers of propylene, or copolymers of propylene with up to 30% by weight of other copolymerized olefins having up to ten carbon atoms. These copolymers of propylene are block or impact copolymers, or preferably random copolymers. If the copolymers of propylene have a random structure, they generally contain, as comonomers, up to 15% by weight, preferably up to 6% by weight, particularly preferably up to 2% by weight, of other olefins having up to 10 carbon atoms, in particular ethylene or 1-butene, or a mixture of ethylene and 1-butene.

The block or impact copolymers of propylene are polymers for which the first stage uses up to 15% by weight, preferably up to 6% by weight, particularly preferably up to 2% by weight, of other olefins having up to 10 carbon atoms as comonomers to prepare a propylene homopolymer or a random copolymer of propylene, onto which a second stage then polymerizes a propylene-ethylene copolymer with ethylene contents of from 15 to 99% by weight, where the propylene-ethylene copolymer may also contain other $C_4$-$C_{10}$ olefins. The amount of the propylene-ethylene copolymer polymerized onto the first polymer is generally such that the end product has a content of from 3 to 90% by weight of the copolymer produced in the second stage.

The random copolymers of propylene are polymers for which the first stage uses up to 15% by weight, preferably up to 6% by weight, particularly preferably up to 2% by weight, of other olefins having up to 10 carbon atoms as comonomers to prepare a propylene homopolymer or a random copolymer of propylene, onto which the second stage then polymerizes a propylene homopolymer or a random copolymer of propylene having up to 15% by weight, preferably up to 6% by weight particularly preferably up to 2% by weight, of comonomers of other olefins having up to 10 carbon atoms. The polymers of the two stages differ in molar mass and comonomer content. The ethylene content is in the polymer product 15% by weight, preferably up to 6% by weight, particularly preferably up to 3% by weight, of comonomer.

The propylene polymers used in the molding compositions of the invention may be prepared, inter alia, by polymerizing the corresponding monomers by means of a Ziegler-Natta catalyst system. Catalyst systems in particular used here are those which comprise not only a titanium-containing solid component a) but also cocatalysts in the form of organic aluminum compounds b) and electron-donor compounds c).

However, the catalysts used to prepare the propylene polymers present in the molding compositions of the invention may also comprise Ziegler-Natta catalyst systems based on metallocene compounds or based on metal complexes with polymerization activity.

The titanium compounds generally used to prepare the titanium-containing solid component a) generally comprise the halides or alcoholates of tri- or tetravalent titanium, but use may also be made of halogenated titanium alkoxy compounds, or of mixtures of various titanium compounds. It is preferable to use the titanium compounds in which the halogen present is chlorine. Preference is also given to the titanium halides which contain only halogen alongside titanium, and among these particular preference is given to titanium chlorides and especially titanium tetrachloride.

The titanium-containing solid component a) preferably comprises at least one halogen-containing magnesium compound. Halogens here are chlorine, bromine, iodine, or fluorine, preference being given to bromine and in particular to chlorine. The halogen-containing magnesium compounds are either used directly during the preparation of the titanium-containing solid component a) or are formed during preparation thereof. Particularly suitable magnesium compounds for preparing the titanium-containing solid component a) are magnesium halides, in particular magnesium dichloride or magnesium dibromide, or magnesium compounds from which the halides can be obtained in a conventional manner, e.g. via reaction with halogenating agents, examples being magnesium alkyl compounds, magnesium aryl compounds, magnesium alkoxy compounds, and magnesium aryloxy compounds, and Grignard compounds. Preferred examples of halogen-free compounds of magnesium which are suitable for preparing the titanium-containing solid component a) are n-butylethylmagnesium and n-butyloctylmagnesium. Preferred halogenating agents are chlorine or hydrogen chloride. However, the titanium halides may also serve as halogenating agents.

The titanium-containing solid component a) also advantageously comprises electron-donor compounds, for example mono- or polyfunctional carboxylic acids, carboxylic anhydrides, or carboxylic esters, or else ketones, ethers, alcohols, lactones, or organophosphorus or organosilicon compounds.

Preferred electron-donor compounds within the titanium-containing solid component are carboxylic acid derivatives, in particular phthalic acid derivatives of the formula (II)

(II)

where each of X and Y is a chlorine atom or bromine atom or a $C_1$-$C_{10}$-alkoxy radical, or X and Y together are oxygen in an anhydride function. Particularly preferred electron-donor compounds are phthalic esters, where X and Y are a $C_1$-$C_8$- alkoxy radical. Examples of phthalic esters preferably used are diethyl phthalate, di-n-butyl phthalate, diisobutyl phthalate, di-n-pentyl phthalate, di-n-hexyl phthalate, di-n-heptyl phthalate, di-n-octyl phthalate, or di-2-ethylhexyl phthalate.

Other preferred electron-donor compounds within the titanium-containing solid component are diesters of 3- or 4-membered, unsubstituted or substituted, cycloalkyl-1,2-dicarboxylic acids, and monoesters of unsubstituted benzophenone-2-carboxylic acids or of substituted benzophenone-2-carboxylic acids. The hydroxy compounds used for these esters are the usual alkanols for esterification reactions, for example $C_1$-$C_{15}$ alkanols or $C_5$-$C_7$ cycloalkanols, which in turn bear one or more $C_1$-$C_{10}$-alkyl groups, or else $C_6$-$C_{10}$ phenols.

It is also possible to use mixtures of various electron-donor compounds.

When preparing the titanium-containing solid component a) use is generally made of from 0.05 to 2.0 mol, preferably from 0.2 to 1.0 mol, of the electron-donor compounds per mole of magnesium compound.

The titanium-containing solid component a) may moreover comprise inorganic oxides as support. The support usually used comprises a finely-divided inorganic oxide whose median particle diameter is from 5 to 200 mm, preferably from 20 to 70 mm. The median particle diameter here is the voluminal median of the particle size distribution determined by Coulter Counter analysis.

The grains of the finely-divided inorganic oxide are preferably composed of primary particles whose median particle size is from 1 to 20 mm, in particular from 1 to 5 mm. The particles termed primary particles are porous granular oxide particles generally obtained by grinding a hydrogel of the inorganic oxide. It is also possible to screen the primary particles prior to their further processing.

Another feature of the inorganic oxide preferably used is that it has cavities or channels with an average diameter of from 0.1 to 20 mm, in particular from 1 to 15 mm, the proportion of these by volume, based on the entire particle, being in the range from 5 to 30%, in particular in the range from 10 to 30%.

The median particle diameters of the primary particles, and also of the macroscopic proportion of the cavities and channels by volume in the inorganic oxide are advantageously determined using image analysis with the aid of scanning electron microscopy or of electron probe microanalysis, using grain surfaces or grain cross sections of the inorganic oxide. The resultant images are evaluated and used to determine the median diameters of the primary particles and the macroscopic proportion of the cavities and channels by volume. The preferred method of analyzing the images involves transferring the electron-microscopy data to a binary image of gray values, and using a suitable EDV program for digital evaluation, an example being the SIS analysis software package.

An example of a method for obtaining the organic oxide whose use is preferred is spray drying of the ground hydrogel, which to this end is mixed with water or with an aliphatic alcohol. These finely-divided inorganic oxides are also available commercially.

The finely-divided inorganic oxide usually also has a pore volume of from 0.1 to 10 cm³/g, preferably from 1.0 to 4.0 cm³/g, and a specific surface area of from 10 to 1 000 m²/g, preferably from 100 to 500 m²/g, the values here being those determined by mercury porosimetry to DIN 66133 and nitrogen adsorption to DIN 66131.

It is also possible to use an inorganic oxide whose pH, i.e. negative decadic logarithm of proton concentration, is in the range from 1 to 6.5, and in particular in the range from 2 to 6.

Inorganic oxides which may be used are especially the oxides of silicon, of aluminum, of titanium, or of one of the metals of the 1st or 2nd groups of the Periodic Table. A particularly preferred oxide, alongside aluminum oxide, or magnesium oxide, or a phyllosilicate, is silicon oxide (silica gel). It is also possible to use mixed oxides, such as aluminum silicates, or magnesium silicates.

Water is present on the surface of the inorganic oxides used as supports. This water is to some extent bonded physically by adsorption and to some extent chemically in the form of hydroxy groups. The water content of the inorganic oxide can be reduced or entirely eliminated by thermal or chemical treatment, and if this is chemical treatment use is made of conventional drying agents, such as $SiCl_4$, chlorosilanes, or aluminum alkyl compounds. The water content of suitable inorganic oxides is from 0 to 6% by weight. It is preferable to use an inorganic oxide in its commercially available form, without further treatment.

The amounts present of the magnesium compound and of the inorganic oxide within the titanium-containing solid component a) are preferably such that from 0.1 to 1.0 mol, in particular from 0.2 to 0.5 mol, of the compound of magnesium is present per mole of the inorganic oxide.

When preparing the titanium-containing solid component a), use is also generally made of $C_1$-$C_8$ alkanols, such as methanol, ethanol, n-propanol, isopropanol, n-butanol, sec-butanol, tert-butanol, isobutanol, n-hexanol, n-heptanol, n-octanol, or 2-ethylhexanol, or a mixture of these. It is preferable to use ethanol.

The titanium-containing solid component may be prepared by methods known per se. Examples of these are given, inter alia, in EP-A 45 975, EP-A 45 977, EP-A 86 473, EP-A 171 200, GB-A 2 111 066, U.S. Pat. Nos. 4,857,613, and 5,288, 824. It is preferable to use the process disclosed in DE-A 195 29 240.

Aluminum compounds b) suitable as cocatalyst, besides trialkylaluminum, are compounds where an alkyl group has been replaced by an alkoxy group or by a halogen atom, for example by chlorine or bromine. The alkyl groups may be identical or differ from one another. Use may be made of linear or branched alkyl groups. It is preferable to use trialkylaluminum compounds having alkyl groups each of which is from 1 to 8 carbon atoms, examples being trimethylaluminum, triethylaluminum, triisobutylaluminum, trioctylaluminum, or methyldiethyl-aluminum, or a mixture of these.

Besides the aluminum compound b), use is generally made of electron-donor compounds c) as another cocatalyst, examples being mono- or polyfunctional carboxylic acids, carboxylic anhydrides, or carboxylic esters, and also ketones, ethers, alcohols, lactones, and organophosphorus and organosilicon compounds, and these electron-donor compounds c) may be the same as or different from those for preparing the titanium-containing solid component a). Preferred electron-donor compounds here are organosilicon compounds of the formula (I)

$$R^1_n Si(OR^2)_{4-n} \tag{I}$$

where $R^1$ is identical or different and is a $C_1$-$C_{20}$-alkyl group, a 5- to 7-membered cycloalkyl group, which in turn may have $C_1$-$C_{10}$-alkyl substitution, a $C_6$-$C_{18}$-aryl group, or a $C_6$-$C_{18}$-aryl-$C_1$-$C_{10}$-alkyl group, $R^2$ is identical or different, and is a $C_1$-$C_{20}$-alkyl group, and n is an integer 1, 2, or 3. Particular preference is given to compounds where $R^1$ is a $C_1$-$C_8$-alkyl group or a 5- to 7-membered cycloalkyl group and $R^2$ is a $C_1$-$C_4$-alkyl group, and n is the number 1 or 2.

Among these compounds, particular emphasis is given to diisopropyldimethoxysilane, isobutylisopropyldimethoxysilane, diisobutyldimethoxysilane, dicyclopentyldimethoxysilane, dicyclohexyldimethoxysilane, cyclohexylmethyldimethoxysilane, isopropyl-tert-butyldimethoxysilane, isobutyl-sec-butyldimethoxysilane, and isopropyl-sec-butyldimethoxysilane.

The amount of the cocatalysts b) and c) used is preferably such that the atomic ratio between aluminum from the aluminum compound b) and titanium from the titanium-containing solid component a) is from 10:1 to 800:1, in particular from 20:1 to 200:1, and such that the molar ratio between the aluminum compound b) and the electron-donor compound c) is from 1:1 to 250:1, in particular from 10:1 to 80:1.

The titanium-containing solid component a), the cocatalysts, the aluminum compound b), and the electron-donor compound c) generally used combine to form the Ziegler-Natta catalyst system.

It is also possible for Ziegler-Natta catalyst systems based on metallocene compounds or based on metal complexes with polymerization activity to be fed into the polymerization reactor in the process for preparing the propylene polymers.

Metallocenes here are complex compounds made from metals of groups 3 to 12 of the Periodic Table with organic ligands, which when combined with metallocenium-ion-forming compounds give effective catalyst systems. For use in the process of the invention, the metallocene complexes are usually present in the catalyst system in supported form. Inorganic oxides are often used as supports. Preference is given to the use of the inorganic oxides described above and also used for preparing the titanium-containing solid component a).

The central atoms present in the metallocenes usually used comprise titanium, zirconium, or hafnium, preferably zirconium. The central atom generally has p-bonding to at least one, generally substituted, cyclopentadienyl group, and also to other substituents. The other substituents may be halogens, hydrogen, or organic radicals, preferably fluorine, chlorine, bromine, or iodine, or a $C_1$-$C_{10}$-alkyl group.

Preferred metallocenes contain central atoms having bonding via two p bonds to two substituted cyclopentadienyl groups and particular preference is given to those metallocenes in which substituents of the cyclopentadienyl groups have bonding to both of the cyclopentadienyl groups. Particular preference is given to complexes whose cyclopentadienyl groups also have substitution at two adjacent carbon atoms by cyclic groups.

Other preferred metallocenes are those which contain only one cyclopentadienyl group, which, however, has substitution by a radical which also has bonding to the central atom.

Examples of suitable metallocene compounds are ethylenebis(indenyl)zirconium dichloride, ethylenebis(tetrahydroindenyl)zirconium dichloride, diphenylmethylene-9-fluorenylcyclopentadienylzirconium dichloride, dimethylsilanediylbis(3-tert-butyl-5-methylcyclopentadienyl)zirconium dichloride, dimethylsilanediylbis(2-methylindenyl)zirconium dichloride, dimethylsilanediylbis(2-methylbenzindenyl)zirconium dichloride, dimethylsilanediylbis(2-methyl-4-phenylindenyl)zirconium dichloride, dimethylsilanediylbis(2-methyl-4-naphthylindenyl)zirconium dichloride, dimethylsilanediylbis(2-methyl-4-isopropylindenyl)zirconium dichloride, or dimethylsilanediylbis(2-methyl-4,6-diisopropylindenyl)zirconium dichloride, and also the corresponding dimethylzirconium compounds.

The metallocene compounds are either known or obtainable by known methods.

The metallocene catalyst systems also comprise metallocenium-ion-forming compounds as cocatalysts. Suitable compounds are strong neutral Lewis acids, ionic compounds having Lewis-acid cations, or ionic compounds with Brönsted acids as cation. Examples of these are tris(pentafluorophenyl)borane or the tetrakis(pentafluorophenyl)borate or other salts of N,N-dimethylanilinium. Other suitable metallocenium-ion-forming compounds, and therefore suitable cocatalysts, are open-chain or cyclic aluminoxane compounds. These are usually prepared by reacting trialkylaluminum compounds with water, and are generally mixtures of different lengths of both linear and cyclic chain molecules.

The metallocene catalyst systems may also comprise organometallic compounds of the metals of the 1st, 2nd, or 13th group of the Periodic Table, examples being n-butyllithium, n-butyl-n-octylmagnesium, or triisobutylaluminum, triethylaluminum, or trimethylaluminum.

To prepare the present propylene polymers, use may be made of the usual reactors for polymerizing $C_2$-$C_{10}$ olefins. Suitable reactors are, inter alia, continuously operated horizontal or vertical stirred tanks, circulating reactors, loop reactors, staged reactors, or fluidized-bed reactors. The size of the reactors is not of any substantial significance for the preparation of the molding compositions of the invention. It depends on the output to be achieved in the reaction zone(s).

It is preferable to carry out the polymerization in at least two stages, first polymerizing in the condensed phase, in particular in liquid propylene, and then in the gas phase, or particularly preferably in a second condensed phase. Both the first and the second stage of the reaction, and also any prior pre-polymerization, may be operated either batchwise or continuously, continuous operation being preferred. This type of two-stage process is described by way of example in EP 877 039 A1. Particularly suitable reactors for the first and second stage are stirred-tank reactors and loop reactors, and other suitable reactors for the second stage of the reaction, if it is carried out in the gas phase, are gas-phase fluidized-bed reactors in which the mixing takes place by agitation.

In one preferred two-stage process, the prepolymer is conveyed to the reaction of the first stage of the polymerization and polymerized in liquid propylene at from 55 to 100° C. with a residence time of from 0.5 to 6 h. The phase ratio is adjusted in the range from 2.5 to 6 l of propylene per kg of polypropylene. Hydrogen is fed in to regulate the molar mass. It is particularly preferable to carry out a copolymerization with ethylene in the liquid phase, i.e. preparing random copolymers. The first stage prepares a polymer with higher molar mass than that in the second reactor. The first stage of the reaction may also be carried out in two reactors arranged in series. After the first stage of the reaction, the multiphase system is transferred to the reactor for the second stage, either to a liquid-phase reactor or via a work-up reactor (flash vessel) finally to a gas-phase reactor.

If a gas-phase reactor is used, the second stage takes place at a pressure of from 10 to 14 bar, at from 30 to 110° C., and with a residence time of from 0.5 to 6 h. Here again, hydrogen can be fed in to regulate the molar mass. If the second stage is likewise carried out in a liquid phase, the polymerization conditions differ from those of the first stage. Another α-olefin, in particular ethylene or 1-butene, can be copolymerized concomitantly here, in particular in the first polymerization stage.

The advantageous embodiments of the invention mentioned may be used advantageously in combination, or else independently of one another. This also in particular applies to the range mentioned for DSC crystallization onset, which provides molding compositions with improved property profile, irrespective of the proportion of the β modification.

The molding compositions of the invention are suitable materials for films, fibers, or moldings, especially as materials for pipes. Their high toughness gives them very good processing properties during the extrusion of pipes whose external diameter $d_a$ is 500 mm or more and whose wall thickness s is greater than or equal to 28.4 mm. Properties of the pipes produced from the molding compositions of the invention are, inter alia, very smooth internal surface, very good results in the long-term internal-hydrostatic-pressure test, and also for circularity and bore-thickness distributions, while the material continues to have high impact strength. In particular, the pipes produced fully comply with the requirements of DIN 8077 in relation to dimensional limits for the average external diameter and ovalities, and the dimensional limits for wall thicknesses.

Compared with pipes with highβ content, a particular feature of pipes made from the molding composition of the invention is higher ring stiffness and better dimensional stability.

EXAMPLES

The melt mass-flow rates (MFR values) in all of the examples were determined to ISO 1133 at 230° C. under a load of 5.0 kg. The ethylene content was determined by infrared spectroscopy, and the polydispersity Mw/Mn by gel permeation chromatography.

The extrapolated crystallization onset temperatures ($T_{eiC}$, Onset) were obtained from DSC as in DIN EN ISO 11357-1, by extrapolating the baseline and the rising flank of the crystallization peak. A Mettler Toledo STAR machine was used with a cooling rate of 10 K/min for the DSC plot. An average of three measured values was always taken.

The content of β modification crystallites was determined by X-ray diffraction analysis, using the Turner-Jones equation as described above.

Example 1

Inventive

Preparation of a High-Molecular-Weight Random Copolymer

A 70 l vessel was carefully inertized and then charged with 50 l of liquid propylene at 30° C. 100 mmol of triethylaluminum and 3.35 mmol of dicyclopentyldimethoxysilane were added, and the mixture was stirred for 15 minutes at 30° C. 450 mg of Montell FT4S M1 catalyst were then added, and, in another step, 2.4 Nl of hydrogen were added. The Montell FT4S M1 catalyst was composed of a titanium-containing solid component made from a titanium compound, and from a magnesium compound, and from a phthalic ester as internal electron donor.

The contents of the vessel were heated to 70° C., with stirring. The polymerization began. The temperature was held constant at 70° C. for 48 minutes. During this time, 68 g of ethylene were fed continuously into the reactor. After 48 minutes, 24 Nl of hydrogen were also added. The temperature was held constant at 70° C. for 36 minutes. The reactor contents were then worked up by depressurization, meaning that the unreacted propylene was removed by evaporation.

This gave 13.6 kg of a propylene copolymer with 0.5% by weight of copolymerized ethylene. The catalyst yield calculated from these data is 29.5 kg of propylene copolymer/g of catalyst, i.e. titanium-containing solid component. The propylene copolymer obtained had a melt flow rate MFR of 0.55 g/10 min, a cold-xylene-soluble fraction of 4.0% by weight, and a polydispersity Mw/Mn of 10.3. The experiment was repeated a number of times in order to prepare a total amount of 500 kg.

Example 2

Inventive

The powder obtained from example 1 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.005% of PV Echtrot E5B (product commercially available from Clariant GmbH, Frankfurt, Germany) was added as nucleating agent. The MFR 230/5 measured on the pellets was 0.84 g/10 min. DSC Onset was determined as 126±0.2° C.

Irganox® 1010 is a product of Ciba Spezialitätenchemie, Basel, and Hostanox® is an antioxidant from Clariant GmbH, Frankfurt, Germany.

Example 3

Inventive

Injection molding was used to produce tensile specimens from the pellets from example 2. A tensile test to ISO 527/1+2 to determine tensile modulus of elasticity was carried out on the tensile specimens. The value measured was s=1238 MPa. The toughness of the molding composition was determined via the Charpy notched impact strength to ISO 179/1 eA. The $a_{cn}$ value measured was 18.9 kJ/m². Both tests were carried out at 23° C.

Plaques of thickness 1 mm were pressed from the pellets, and subjected to X-ray analysis to determine the proportion of the β modification. The peak heights gave a proportion of 6% of β modification.

Example 4

Inventive

The pellets from example 2 were processed on an extrusion plant (screw diameter $d_s$=90 mm, L/D=30, grooved bush with thermal isolation, spiral-groove distributor, vacuum spray tank calibration), to give pipes of dimensions 500×45.4 mm (external diameter $d_a$=500 mm, wall thickness s=45.4 mm). The weight throughput was from 380 to 410 kg/h, depending on the take-off speed. The barrel temperatures were set so as to give a melt temperature of 215° C.

The processing was found to run very consistently, and the inner surface of the pipe was very smooth. The pipes had a satisfactory circular cross section. The dimensional limit for ovality to DIN 8077 was not exceeded.

Wall thickness was determined at six test points with sixty-degree separation around the pipe. For pipes of these dimensions to DIN 8077, the wall thickness has to be from s=45.0 to s=49.8 mm (the values given being averages measured on 3 pipes).

| Test point 1 | (top of pipe): | $s_1 = 45.3$ mm |
| --- | --- | --- |
| Test point 2 | (sixty degrees distant from 1 clockwise): | $s_2 = 46.4$ mm |
| Test point 3 | (sixty degrees distant from 2 clockwise): | $s_3 = 47.5$ mm |
| Test point 4 | (sixty degrees distant from 3 clockwise): | $s_4 = 48.1$ mm |
| Test point 5 | (sixty degrees distant from 4 clockwise): | $s_5 = 47.2$ mm |
| Test point 6 | (sixty degrees distant from 5 clockwise): | $s_6 = 46.1$ mm |

Roughness was measured on the inner surface of the pipe, which was very smooth:
The following values were found:

| a) | maximum isolated roughness depth | $R_{max}$: | 2.99 mm |
| --- | --- | --- | --- |
| b) | average roughness depth | $R_z$: | 2.79 mm |
| c) | arithmetic mean roughness | $R_a$: | 0.35 mm |
| d) | maximum roughness depth | $R_t$: | 3.25 mm |

The DIN 8078 long-term internal-hydrostatic-pressure test was carried out on the pipe:

| Test temperature | Test stress | Min. time to failure to DIN 8078 | Measured time to failure |
| --- | --- | --- | --- |
| 95° C. | 3.5 N/mm² | >1000 h | 1852 h |
| 120° C. | 3.0 N/mm² | >200 h | 321 h |

The results complied with the minimum times to failure required.

The pipe was also subjected to a flexural impact test to DIN 8078 at 15° C. and 23° C., using a nominal impact-pendulum energy of 15 J. The test specimens for this were taken from the pipe wall mechanically. The test was passed at both temperatures. The test specimens withstood the flexural impact without fracture. The energy absorbed was 100 kJ/m² at 23° C., 98 kJ/m² at 15° C.

Example 5

Comparative Example

The powder obtained from example 1 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.2% of ultrafine talc (product commercially available from Luzenac) was added as nucleating agent. The MFR 230/5 measured on the pellets was 0.85 g/10 min. DSC Onset was determined as 119±0.4° C.

Example 6

Comparative Example

Injection molding was used to produce tensile specimens from the pellets from example 5. A tensile test to ISO 527/1+2 to determine tensile modulus of elasticity was carried out on the tensile specimens. The value measured was s=1342 MPa. The toughness of the molding composition was determined via the Charpy notched impact strength to ISO 179/1 eA. The $a_{cn}$ value measured was 8.9 kJ/m². Both tests were carried out at 23° C.

Plaques of thickness 1 mm were pressed from the pellets, and subjected to X-ray analysis to determine the proportion of the β modification. No detectable content of β modification was found.

Example 7

Comparative Example

The pellets from example 5 were processed on an extrusion plant (screw diameter $d_s$=90 mm, L/D=30, grooved bush with thermal isolation, spiral-groove distributor, vacuum spray tank calibration), to give pipes of dimensions 500×45.4 mm (external diameter $d_a$=500 mm, wall thickness s=45.4 mm). The weight throughput was from 380 to 410 kg/h, depending on the take-off speed. The barrel temperatures were set so as to give a melt temperature of 215° C.

The processing was found to run very consistently. The pipes had a circular cross section. The dimensional limit for ovality to DIN 8077 was not exceeded.

Wall thickness was determined at six test points with sixty-degree separation around the pipe. For pipes of these dimensions to DIN 8077, the wall thickness has to be from s=45.0 to s=49.8 mm (the values given being averages measured on 3 pipes).

| Test point 1 | (top of pipe): | $s_1 = 45.8$ mm |
| --- | --- | --- |
| Test point 2 | (sixty degrees distant from 1 clockwise): | $s_2 = 47.2$ mm |
| Test point 3 | (sixty degrees distant from 2 clockwise): | $s_3 = 48.6$ mm |
| Test point 4 | (sixty degrees distant from 3 clockwise): | $s_4 = 49.1$ mm |
| Test point 5 | (sixty degrees distant from 4 clockwise): | $s_5 = 48.3$ mm |
| Test point 6 | (sixty degrees distant from 5 clockwise): | $s_6 = 46.9$ mm |

Roughness was measured on the inner surface of the pipe, which was very rough:
The following values were found:

| a) | maximum isolated roughness depth | $R_{max}$: | 12.13 mm |
| --- | --- | --- | --- |
| b) | average roughness depth | $R_z$: | 9.83 mm |
| c) | arithmetic mean roughness | $R_a$: | 1.31 mm |
| d) | maximum roughness depth | $R_t$: | 12.18 mm |

The DIN 8078 long-term internal-hydrostatic-pressure test was carried out on the pipe:

| Test temperature | Test stress | Min. time to failure to DIN 8078 | Measured time to failure |
| --- | --- | --- | --- |
| 95° C. | 3.5 N/mm² | >1000 h | 1349 h |
| 120° C. | 3.0 N/mm² | >200 h | 283 h |

The results complied with the minimum times to failure required.

The pipe was also subjected to a flexural impact test to DIN 8078 at 15° C. and 23° C., using a nominal impact-pendulum energy of 15 J. The test specimens for this were taken from the pipe wall mechanically. The test specimens withstood the impact only at 23° C. The test was not passed at 15° C. The energy absorbed was 88 kJ/m² at 23° C., 78 kJ/m² at 15° C.

Example 8

Comparative Example

Preparation of a High-Molecular-Weight Random Copolymer

A 70 l vessel was carefully inertized and then charged with 50 l of liquid propylene at 30° C. 100 mmol of triethylaluminum and 3.35 mmol of dicyclopentyldimethoxysilane were added, and the mixture was stirred for 15 minutes at 30° C. 450 mg of Montell FT4S M1 catalyst were then added, and in a further step 2.9 NI of hydrogen were added.

The contents of the vessel were heated to 70° C., with stirring. The polymerization began. The temperature was held constant at 70° C. for 48 minutes. During this period, 68 g of ethylene were fed continuously into the reactor. After 48 minutes, 29 NI of hydrogen were also added. The temperature was held constant at 70° C. for 36 minutes. The reactor contents were then worked up by depressurization, meaning that the unreacted propylene was removed by evaporation.

This gave 13.6 kg of a propylene copolymer with 0.5% by weight of copolymerized ethylene. The catalyst yield calculated from these data is 29.5 kg of propylene copolymer/g of catalyst, i.e. titanium-containing solid component. The resultant propylene copolymer had a melt flow rate MFR of 0.90 g/110 min, a cold-xylene-soluble fraction of 4.0% by weight, and a polydispersity Mw/Mn of 10.3. The experiment was repeated a number of times in order to prepare a total amount of 500 kg.

Example 9

Comparative Example

The powder obtained from example 8 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.2% of ultrafine talc (product commercially available from Luzenac) was added as nucleating agent. The MFR 230/5 measured on the pellets was 1.04 g/10 min. DSC Onset was determined as 120±0.3° C.

Example 10

Comparative Example

Injection molding was used to produce tensile specimens from the pellets from example 9. A tensile test to ISO 527/1+2 to determine tensile modulus of elasticity was carried out on the tensile specimens. The value measured was s=1385 MPa. The toughness of the molding composition was determined via the Charpy notched impact strength to ISO 179/1 eA. The $a_{cn}$ value measured was 7.8 kJ/m². Both tests were carried out at 23° C.

Example 11

Comparative Example

The pellets from example 9 were processed on an extrusion plant (screw diameter $d_s$=90 mm, L/D=30, grooved bush with thermal isolation, spiral-groove distributor, vacuum spray tank calibration), to give pipes of dimensions 500×45.4 mm (external diameter $d_a$=500 mm, wall thickness s=45.4 mm). The weight throughput was from 380 to 410 kg/h, depending on the take-off speed. The barrel temperatures were set so as to give a melt temperature of 215° C. It was impossible to produce pipes suitable for the subsequent application. The pipes were not circular with respect to external diameter, and the wall thickness distribution was non-uniform. They did not comply with the requirements of DIN 8077 with respect to the dimensional limits for the average external diameters and the ovalities, and the dimensional limits for the wall thicknesses.

The inner surface of the pipes was very rough.

No long-term internal-hydrostatic-pressure test was carried out.

The DIN 8078 flexural impact test was carried out on the pipe at 23° C. and 15° C., using an impact pendulum with nominal energy 15 J. The test specimens for this were removed mechanically from the pipe wall. Only the test at 23° C. was passed. The energy absorbed was 80 kJ/m² at 23° C., 63 kJ/m² at 15° C.

Example 12

Inventive

Preparation of a High-Molecular-Weight Random Copolymer:

A 70 l vessel was carefully inertized and charged with 50 l of liquid propylene at 30° C. 100 mmol of triethylaluminum and 20 mmol of dicyclopentyldimethoxysilane were added, and the mixture was stirred for 15 minutes at 30° C. 346 mg of Montell FT4S M1 catalyst were then added, and in another step 3.2 NI of hydrogen were added. 100 g of ethylene were also added.

The contents of the vessel were heated to 70° C., with stirring. The polymerization began. The temperature was held constant at 70° C. for 48 minutes. During the entire polymerization a total of 400 g of ethylene were continuously fed into the reactor. After 48 minutes, 32 NI of hydrogen were also added. The temperature was held constant at 70° C. for 36 minutes. The reactor contents were then worked up by depressurization, meaning that the unreacted propylene was removed by evaporation.

This gave 10.6 kg of a propylene copolymer with 4.1% by weight of copolymerized ethylene. The catalyst yield calculated from these data is 30.6 kg of propylene copolymer/g of catalyst, i.e. titanium-containing solid component. The resultant propylene copolymer had a melt flow rate MFR of 0.57 g/min, a cold-xylene-soluble fraction of 4.0% by weight, and polydispersity Mw/Mn of 10.7. The experiment was repeated a number of times to prepare a total amount of 500 kg.

Example 13

Inventive

The powder obtained from example 12 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.005% of PV Echtrot E5B (product commercially available from Clariant GmbH, Frankfurt, Germany)

was added as nucleating agent. The MFR 230/5 measured on the pellets was 0.83 g/10 min. DSC Onset was determined as 113±0.3° C.

Example 14

Inventive

Injection molding was used to produce tensile specimens from the pellets from example 13. A tensile test to ISO 527/1+2 to determine tensile modulus of elasticity was carried out on the tensile specimens. The value measured at 23° C. was s=847 MPa. The toughness of the molding composition was determined via the Charpy notched impact strength to ISO 179/1 eA. The $a_{cn}$ value measured was 7.3 kJ/m².

Example 15

Inventive

The pellets from example 13 were processed on an extrusion plant (screw diameter $d_s$=90 mm, L/D=30, grooved bush with thermal isolation, spiral-groove distributor, vacuum spray tank calibration), to give pipes of dimensions 800×45.3 mm (external diameter $d_a$=800 mm, wall thickness s=45.3 mm). The weight throughput was from 380 to 410 kg/h, depending on the take-off speed. The barrel temperatures were set so as to give a melt temperature of 215° C.

The processing was found to run very consistently, and the inner surface of the pipe was very smooth. The pipes had a satisfactory circular cross section. The dimensional limit for ovality to DIN 8077 was not exceeded.

Wall thickness was determined at six test points with sixty-degree separation around the pipe. For pipes of these dimensions to DIN 8077, the wall thickness has to be from s=45.0 to s=49.8 mm (the values given being averages measured on 3 pipes).

| Test point 1 | (top of pipe): | $s_1$ = 45.2 mm |
| Test point 2 | (sixty degrees distant from 1 clockwise): | $s_2$ = 46.6 mm |
| Test point 3 | (sixty degrees distant from 2 clockwise): | $s_3$ = 47.9 mm |
| Test point 4 | (sixty degrees distant from 3 clockwise): | $s_4$ = 48.3 mm |
| Test point 5 | (sixty degrees distant from 4 clockwise): | $s_5$ = 47.2 mm |
| Test point 6 | (sixty degrees distant from 5 clockwise): | $s_6$ = 45.8 mm |

Roughness was measured on the inner surface of the pipe, which was very smooth:

The following values were found:

| a) | maximum isolated roughness depth | $R_{max}$: | 4.61 mm |
| b) | average roughness depth | $R_z$: | 4.10 mm |
| c) | arithmetic mean roughness | $R_a$: | 0.72 mm |
| d) | maximum roughness depth | $R_t$: | 4.70 mm |

The DIN 8078 long-term internal-hydrostatic-pressure test was carried out on the pipe:

| Test temperature | Test stress | Min. time to failure to DIN 8078 | Measured time to failure |
| --- | --- | --- | --- |
| 95° C. | 3.5 N/mm² | >1000 h | 3429 h |
| 120° C. | 3.0 N/mm² | >200 h | 411 h |

The results complied with the minimum times to failure required.

The pipe was also subjected to a flexural impact test to DIN 8078 at 0° C. and −5° C., using a nominal impact-pendulum energy of 15 J. The test specimens for this were taken from the pipe wall mechanically. The test was passed at both temperatures. The test specimens withstood the impact without fracture. The energy absorbed was 85 kJ/m² at 0° C., 80 kJ/m² at −5° C.

Example 16

Comparative Example

The powder obtained from example 12 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.2% of ultrafine talc (product commercially available from Luzenac) was added as nucleating agent. The MFR 230/5 measured on the pellets was 0.85 g/10 min. DSC Onset was determined as 105±0.3° C.

Example 17

Comparative Example

Injection molding was used to produce tensile specimens from the pellets from example 16. A tensile test to ISO 527/1+2 to determine tensile modulus of elasticity was carried out on the tensile specimens. The value measured at 23° C. was s=871 MPa. The toughness of the molding composition was determined via the Charpy notched impact strength to ISO 179/1 eA. The $a_{cn}$ value measured was 6.4 kJ/m².

Example 18

Comparative Example

The pellets from example 16 were processed on an extrusion plant (screw diameter $d_s$=90 mm, L/D=30, grooved bush with thermal isolation, spiral-groove distributor, vacuum spray tank calibration), to give pipes of dimensions 800×45.3 mm (external diameter $d_a$=800 mm, wall thickness s=45.3 mm). The weight throughput was from 380 to 410 kg/h, depending on the take-off speed. The barrel temperatures were set so as to give a melt temperature of 215° C. The processing was found to proceed very consistently.

The pipes had a circular cross section. The dimensional limit for ovality to DIN 8077 was not exceeded.

Wall thickness was determined at six test points with sixty-degree separation around the pipe. For pipes of these dimensions to DIN 8077, the wall thickness has to be from s=45.0 to s=49.8 mm (the values given being averages measured on 3 pipes).

| Test point 1 | (top of pipe): | $s_1 = 45.3$ mm |
| Test point 2 | (sixty degrees distant from 1 clockwise): | $s_2 = 46.9$ mm |
| Test point 3 | (sixty degrees distant from 2 clockwise): | $s_3 = 48.7$ mm |
| Test point 4 | (sixty degrees distant from 3 clockwise): | $s_4 = 49.3$ mm |
| Test point 5 | (sixty degrees distant from 4 clockwise): | $s_5 = 47.9$ mm |
| Test point 6 | (sixty degrees distant from 5 clockwise): | $s_6 = 46.3$ mm |

Roughness was measured on the inner surface of the pipe, which was very rough:
The following values were found:

| a) | maximum isolated roughness depth | $R_{max}$: | 11.52 mm |
| b) | average roughness depth | $R_z$: | 9.44 mm |
| c) | arithmetic mean roughness | $R_a$: | 1.60 mm |
| d) | maximum roughness depth | $R_t$: | 12.62 mm |

The DIN 8078 long-term internal-hydrostatic-pressure test was carried out on the pipe:

| Test temperature | Test stress | Min. time to failure to DIN 8078 | Measured time to failure |
|---|---|---|---|
| 95° C. | 3.5 N/mm² | >1000 h | 2765 h |
| 120° C. | 3.0 N/mm² | >200 h | 378 h |

The results complied with the minimum times to failure required.

The pipe was also subjected to a flexural impact test to DIN 8078 at 0° C. and −5° C., using a nominal impact-pendulum energy of 15 J. The test specimens for this were taken from the pipe wall mechanically. Only the test at 0° C. was passed. The energy absorbed was 80 kJ/m² at 0° C., 78 kJ/m² at −5° C.

Example 19

Comparative Example

Preparation of a High-Molecular-Weight Random Copolymer:

A 70 l vessel was carefully inertized and charged with 50 l of liquid propylene at 30° C. 100 mmol of triethylaluminum and 20 mmol of dicyclopentyldimethoxysilane were added, and the mixture was stirred for 15 minutes at 30° C. 346 mg of Montell FT4S M1 catalyst were then added, and in a further step 3.4 Nl of hydrogen were added. 100 g of ethylene were also added.

The contents of the vessel were heated to 70° C., with stirring. The polymerization began. The temperature was held constant at 70° C. for 48 minutes. During the entire polymerization, a total of 400 g of ethylene were fed continuously into the reactor. After 48 minutes, 34 Nl of hydrogen were also added. The temperature was held constant at 70° C. for 36 minutes. The reactor contents were then worked up by depressurization, meaning that the unreacted propylene was removed by evaporation.

This gave 10.6 kg of a propylene copolymer with 4.1% by weight of copolymerized ethylene. The catalyst yield calculated from these data is 30.6 kg of propylene copolymer/g of catalyst, i.e. titanium-containing solid component. The resultant propylene copolymer had a melt flow rate MFR of 1.10 g/min, a cold-xylene-soluble fraction of 4.0% by weight, and a polydispersity Mw/Mn of 10.3. The experiment was repeated a number of times in order to prepare a total amount of 500 kg.

Example 20

Comparative Example

The powder obtained from example 19 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.2% of ultrafine talc (commercially available product from Luzenac) was added as nucleating agent. The MFR 230/5 measured on the pellets was 1.12 g/10 min. DSC Onset was determined as 107±0.4° C.

Example 21

Comparative Example

Injection molding was used to produce tensile specimens from the pellets from example 20. A tensile test to ISO 527/1+2 to determine tensile modulus of elasticity was carried out on the tensile specimens. The value measured at 23° C. was s=893 MPa. The toughness of the molding composition was determined via the Charpy notched impact strength at 0° C. to ISO 179/1 eA. The $a_{cn}$ value measured was 5.5 kJ/m².

Example 22

Comparative Example

The pellets from example 20 were processed on an extrusion plant (screw diameter $d_s$=90 mm, L/D=30, grooved bush with thermal isolation, spiral-groove distributor, vacuum spray tank calibration), to give pipes of dimensions 800×45.3 mm (external diameter $d_a$=800 mm, wall thickness s=45.3 mm). The weight throughput was from 380 to 410 kg/h, depending on the take-off speed. The barrel temperatures were set so as to give a melt temperature of 215° C.

It was impossible to produce pipes suitable for the subsequent application. The pipes were not circular with respect to external diameter, and the wall thickness distribution was non-uniform. The pipes did not comply with the requirements of DIN 8077 with respect to dimensional limits for the average external diameters, and the ovalities, and the dimensional limits for the wall thicknesses. The inner surface of the pipes was very rough.

No long-term internal-hydrostatic-pressure test was carried out.

The DIN 8078 flexural impact test was carried out on the pipe at 0° C. and −5° C., using an impact pendulum with a nominal energy of 15 J. The test specimens for this were mechanically removed from the pipe wall. The test was passed only at 0° C. The energy absorbed was 74 kJ/m² at 0° C., 61 kJ/m² at −5° C.

Example 23

Inventive

Preparation of a High-Molecular-Weight Block Copolymer

A 70 l vessel was carefully inertized and charged with 50 l of liquid propylene 30° C. 100 mmol of triethylaluminum and 10 mmol of dicyclopentyldimethoxysilane were added, and the mixture was stirred for 15 minutes at 30° C. 346 mg of Montell FT4S M1 catalyst were then added, and in a further step 8.9 NI of hydrogen were added.

The contents of the vessel were heated to 70° C., with stirring. The polymerization began. The temperature was held constant at 70° C. for 48 minutes. After 48 minutes, the internal reactor pressure was reduced to 10 bar. Over a period of 12 minutes, 3.5 NI of hydrogen, 850 g of ethylene, and 550 g of propylene were run in. Pressure and temperature were held constant.

The reactor contents were then worked up by depressurization, meaning that the unreacted propylene was removed by evaporation.

This gave 13.5 kg of a propylene copolymer with 6.2% by weight of copolymerized ethylene. The catalyst yield calculated from these data is 39.0 kg of propylene copolymer/g of catalyst, i.e. titanium-containing solid component. The resultant propylene copolymer had a melt flow rate MFR of 0.58 g/min and a cold-xylene-soluble fraction of 11.0% by weight.

Example 24

Inventive

The powder obtained from example 23 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.005% of PV Echtrot E5B (product commercially available from Clariant GmbH, Frankfurt, Germany) was added as nucleating agent. The MFR 230/5 measured on the pellets was 0.84 g/10 min. DSC Onset was determined as 124±0.3° C.

Example 25

Inventive

Injection molding was used to produce tensile specimens from the pellets from example 24. A tensile test to ISO 527/1+2 to determine tensile modulus of elasticity was carried out on the tensile specimens at 23° C. The value measured at 23° C. was s=1123 MPa. The toughness of the molding composition was determined via the Charpy notched impact strength at 0° C. to ISO 179/1 eA. The $a_{cn}$ value measured was 15.9 kJ/m².

Example 26

Inventive

The pellets from example 24 were processed on an extrusion plant (screw diameter $d_s$=90 mm, L/D=30, grooved bush with thermal isolation, spiral-groove distributor, vacuum spray tank calibration), to give pipes of dimensions 500×5.4 mm (external diameter $d_a$=500 mm, wall thickness s=45.4 mm). The weight throughput was from 380 to 410 kg/h, depending on the take-off speed. The barrel temperatures were set so as to give a melt temperature of 215° C.

The processing was found to run very consistently, and the inner surface of the pipe was very smooth. The pipes had a satisfactory circular cross section. The dimensional limit for ovality to DIN 8077 was not exceeded.

Wall thickness was determined at six test points with sixty-degree separation around the pipe. For pipes of these dimensions to DIN 8077, the wall thickness has to be from s=45.0 to s=49.8 mm (the values given being averages measured on 3 pipes).

| Test point 1 | (top of pipe): | $s_1$ = 45.3 mm |
|---|---|---|
| Test point 2 | (sixty degrees distant from 1 clockwise): | $s_2$ = 46.4 mm |
| Test point 3 | (sixty degrees distant from 2 clockwise): | $s_3$ = 47.5 mm |
| Test point 4 | (sixty degrees distant from 3 clockwise): | $s_4$ = 48.6 mm |
| Test point 5 | (sixty degrees distant from 4 clockwise): | $s_5$ = 47.5 mm |
| Test point 6 | (sixty degrees distant from 5 clockwise): | $s_6$ = 46.2 mm |

Roughness was measured on the inner surface of the pipe, which was very smooth:

The following values were found:

| a) | maximum isolated roughness depth | $R_{max}$: | 9.90 mm |
|---|---|---|---|
| b) | average roughness depth | $R_z$: | 8.06 mm |
| c) | arithmetic mean roughness | $R_a$: | 1.15 mm |
| d) | maximum roughness depth | $R_t$: | 10.35 mm |

The DIN 8078 long-term internal-hydrostatic-pressure test was carried out on the pipe:

| Test temperature | Test stress | Min. time to failure to DIN 8078 | Measured time to failure |
|---|---|---|---|
| 95° C. | 2.60 N/mm² | >1000 h | 1465 h |
| 120° C. | 3.00 N/mm² | >200 h | 327 h |

The results complied with the minimum times to failure required.

The pipe was also subjected to a flexural impact test to DIN 8078 at 0° C. and −10° C., using a nominal impact-pendulum energy of 15 J. The test specimens for this were taken from the pipe wall mechanically. The test was passed at both temperatures. The test specimens withstood the impact without fracture. The energy absorbed was 97 kJ/m² at 0° C., 96 kJ/m² at −10° C.

Example 27

Comparative Example

The powder obtained from example 23 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.2% of ultrafine talc (product commercially available from Luzenac) was added as nucleating agent. The MFR 230/5 measured on the pellets was 0.87 g/10 min. DSC Onset was determined as 117±0.3° C.

Example 28

Comparative Example

Injection molding was used to produce tensile specimens from the pellets from example 27. A tensile test to ISO 527/1+2 to determine tensile modulus of elasticity was carried out on the tensile specimens at 23° C. The value measured was s=1218 MPa. The toughness of the molding composition was determined via the Charpy notched impact strength at 0° C. to ISO 179/1 eA. The $a_{cn}$ value measured was 11.6 kJ/m².

Example 29

Comparative Example

The pellets from example 27 were processed on an extrusion plant (screw diameter $d_s$=90 mm, L/D=30, grooved bush with thermal isolation, spiral-groove distributor, vacuum spray tank calibration), to give pipes of dimensions 500×45.4 mm (external diameter $d_a$=500 mm, wall thickness s=45.4 mm). The weight throughput was from 380 to 410 kg/h, depending on the take-off speed. The barrel temperatures were set so as to give a melt temperature of 215° C.

The processing was found to run very consistently. The pipes had a circular cross section. The dimensional limit for ovality to DIN 8077 was not exceeded.

Wall thickness was determined at six test points with sixty-degree separation around the pipe. For pipes of these dimensions to DIN 8077, the wall thickness has to be from s=45.0 to s=49.8 mm (the values given being averages measured on 3 pipes).

| Test point 1 | (top of pipe): | $s_1$ = 45.2 mm |
| Test point 2 | (sixty degrees distant from 1 clockwise): | $s_2$ = 47.6 mm |
| Test point 3 | (sixty degrees distant from 2 clockwise): | $s_3$ = 49.0 mm |
| Test point 4 | (sixty degrees distant from 3 clockwise): | $s_4$ = 49.7 mm |
| Test point 5 | (sixty degrees distant from 4 clockwise): | $s_5$ = 48.6 mm |
| Test point 6 | (sixty degrees distant from 5 clockwise): | $s_6$ = 47.2 mm |

Roughness was measured on the inner surface of the pipe, which was very rough:

The following values were found:

| a) | maximum isolated roughness depth | $R_{max}$: | 11.33 mm |
| b) | average roughness depth | $R_z$: | 8.83 mm |
| c) | arithmetic mean roughness | $R_a$: | 1.34 mm |
| d) | maximum roughness depth | $R_t$: | 12.05 mm |

The DIN 8078 long-term internal-hydrostatic-pressure test was carried out on the pipe:

| Test temperature | Test stress | Min. time to failure to DIN 8078 | Measured time to failure |
|---|---|---|---|
| 95° C. | 2.60 N/mm² | >1000 h | 1356 h |
| 120° C. | 3.00 N/mm² | >200 h | 345 h |

The results complied with the minimum times to failure required.

The pipe was also subjected to a flexural impact test to DIN 8078 at 15° C. and 23° C., using a nominal impact-pendulum energy of 15 J. The test specimens for this were taken from the pipe wall mechanically. The test specimens withstood the impact. At −10° C. the test was not passed. The energy absorbed was 95 kJ/m² at 0° C., 82 kJ/m² at −10° C.

Example 30

Comparative Example

Preparation of a High-Molecular-Weight Block Copolymer:

A 70 l vessel was carefully inertized and charged with 50 l of liquid propylene at 30° C. 100 mmol of triethylaluminum and 10 mmol of dicyclopentyldimethoxysilane were added, and the mixture was stirred for 15 minutes at 30° C. 346 mg of Montell FT4S M1 catalyst were then added, and, in another step, 9.3 Nl of hydrogen were added.

The contents of the vessel were heated to 70° C., with stirring. The polymerization began. The temperature was held constant at 70° C. for 48 minutes. After 48 minutes, the internal reactor pressure was reduced to 10 bar. During a period of 12 minutes, 3.7 Nl of hydrogen, 850 g of ethylene, and 550 g of propylene were run in. Pressure and temperature were held constant.

The reactor contents were then worked up by depressurization, meaning that the unreacted propylene was removed by evaporation.

This gave 13.5 kg of a propylene copolymer with 6.2% by weight of copolymerized ethylene. The catalyst yield calculated from these data is 39.0 kg of propylene copolymer/g of catalyst, i.e. titanium-containing solid component. The resultant propylene copolymer had a melt flow rate MFR of 1.16 g/min and a cold-xylene-soluble fraction of 11.0% by weight.

Example 31

Comparative Example

The powder obtained from example 30 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.2% of ultrafine talc (product commercially available from Luzenac) were added as nucleating agent. The MFR 230/5 measured on the pellets was 1.16 g/10 min. DSC Onset was determined as 116±0.2° C.

Example 32

Comparative Example

Injection molding was used to produce tensile specimens from the pellets from example 31. A tensile test to ISO 527/

1+2 to determine tensile modulus of elasticity was carried out on the tensile specimens. The value measured at 23° C. was s=1265 MPa. The toughness of the molding composition was determined via the Charpy notched impact strength at 0° C. to ISO 179/1 eA. The $a_{cn}$ value measured was 7.1 kJ/m².

Example 33

Comparative Example

The pellets from example 31 were processed on an extrusion plant (screw diameter $d_s$=90 mm, L/D=30, grooved bush with thermal isolation, spiral-groove distributor, vacuum spray tank calibration), to give pipes of dimensions 500×45.4 mm (external diameter $d_a$=500 mm, wall thickness s=45.4 mm). The weight throughput was from 380 to 410 kg/h, depending on the take-off speed. The barrel temperatures were set so as to give a melt temperature of 215° C.

It was impossible to produce pipes suitable for the subsequent application. The pipes were not circular with respect to external diameter, and the wall thickness distribution was non-uniform. The pipes did not comply with the requirements of DIN 8077 in relation to the dimensional limits for the average external diameters and the ovalities, and the dimensional limits for the wall thicknesses. The inner surface of the pipes was very rough.

No long-term internal-hydrostatic-pressure test was carried out.

The pipe was also subjected to a flexural impact test to DIN 8078 at 0° C. and −10° C., using a nominal impact-pendulum energy of 15 J. The test specimens for this were taken from the pipe wall mechanically. The test was passed only at 0° C. The energy absorbed was 75 kJ/m² at 0° C., 58 kJ/m² at −10° C.

Example 34

Preparation of a High-Molecular-Weight Propylene Homopolymer:

A 70 l vessel carefully inertized and charged with 50 l of liquid propylene at 30° C. 100 mmol of triethylaluminum and 5 mmol of dicyclopentyidimethoxysilane were added, and the mixture was stirred for 15 minutes at 30° C. 376 mg of Montell FT4S M1 catalyst were then added, and in another step 10.9 Nl of hydrogen were added.

The contents of the vessel were heated to 70° C., with stirring. The polymerization began. The temperature was held constant at 70° C. for 48 minutes. The reactor contents were then worked up by depressurization, meaning that the unreacted propylene was removed by evaporation.

This gave 8.6 kg of a propylene homopolymer. The catalyst yield calculated from these data is 22.8 kg of propylene homopolymer/g of catalyst, i.e. titanium-containing solid component. The resultant propylene homopolymer had a melt flow rate MFR of 0.59 g/min and a cold-xylene-soluble fraction of 2.5% by weight.

Example 35

Inventive

The powder obtained from example 34 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.005% of PV Echtrot E5B (product commercially available from Clariant GmbH, Frankfurt, Germany) was added as nucleating agent. The MFR 230/5 measured on the pellets was 0.82 g/10 min. DSC Onset was determined as 124±0.3° C.

Example 36

Inventive

Injection molding was used to produce tensile specimens from the pellets from example 35. A tensile test to ISO 527/1+2 to determine tensile modulus of elasticity was carried out on the tensile specimens. The value measured was s=1287 MPa. The toughness of the molding composition was determined via the Charpy notched impact strength to ISO 179/1 eA. The $a_{cn}$ value measured was 12.5 kJ/m². Both tests were carried out at 23° C.

Example 37

Inventive

The pellets from example 35 were processed on an extrusion plant (screw diameter $d_s$=90 mm, L/D=30, grooved bush with thermal isolation, spiral-groove distributor, vacuum spray tank calibration), to give pipes of dimensions 800×45.3 mm (external diameter $d_a$=800 mm, wall thickness s=45.3 mm). The weight throughput was from 380 to 410 kg/h, depending on the take-off speed. The barrel temperatures were set so as to give a melt temperature of 215° C.

The processing was found to run very consistently, and the inner surface of the pipe was very smooth. The pipes had a satisfactory circular cross section. The dimensional limit for ovality to DIN 8077 was not exceeded.

Wall thickness was determined at six test points with sixty-degree separation around the pipe. For pipes of these dimensions to DIN 8077, the wall thickness has to be from s=45.0 to s=49.8 mm (the values given being averages measured on 3 pipes).

| Test point 1 | (top of pipe): | $s_1$ = 45.4 mm |
|---|---|---|
| Test point 2 | (sixty degrees distant from 1 clockwise): | $s_2$ = 46.2 mm |
| Test point 3 | (sixty degrees distant from 2 clockwise): | $s_3$ = 47.6 mm |
| Test point 4 | (sixty degrees distant from 3 clockwise): | $s_4$ = 48.6 mm |
| Test point 5 | (sixty degrees distant from 4 clockwise): | $s_5$ = 47.4 mm |
| Test point 6 | (sixty degrees distant from 5 clockwise): | $s_6$ = 46.5 mm |

Roughness was measured on the inner surface of the pipe, which was very smooth:

The following values were found:

| a) | maximum isolated roughness depth | $R_{max}$: | 3.25 mm |
|---|---|---|---|
| b) | average roughness depth | $R_z$: | 2.59 mm |
| c) | arithmetic mean roughness | $R_a$: | 0.34 mm |
| d) | maximum roughness depth | $R_t$: | 3.25 mm |

The DIN 8078 long-term internal-hydrostatic-pressure test was carried out on the pipe:

| Test temperature | Test stress | Min. time to failure to DIN 8078 | Measured time to failure |
|---|---|---|---|
| 95° C. | 3.5 N/mm² | >1000 h | 1429 h |
| 120° C. | 3.0 N/mm² | >200 h | 309 h |

The results complied with the minimum times to failure required.

The pipe was also subjected to a flexural impact test to DIN 8078 at 15° C. and 23° C., using a nominal impact-pendulum energy of 15 J. The test specimens for this were taken from the pipe wall mechanically. The test was passed at both temperatures. The test specimens withstood the impact without fracture. The energy absorbed was 87 kJ/m² at 23° C., 64 kJ/m² at 15° C.

Example 38

Comparative Example

The powder obtained from example 34 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.2% of ultrafine talc (product commercially available from Luzenac) was added as nucleating agent. The MFR 230/5 measured on the pellets was 0.86 g/10 min. DSC Onset was determined as 117±0.2° C.

Example 39

Comparative Example

Injection molding was used to produce tensile specimens from the pellets from example 38. A tensile test to ISO 527/1+2 to determine tensile modulus of elasticity was carried out on the tensile specimens. The value measured was s=1348 MPa. The toughness of the molding composition was determined via the Charpy notched impact strength at 0° C. to ISO 179/1 eA. The $a_{cn}$ value measured was 8.3 kJ/m². Both tests were carried out at 23° C.

Example 40

Comparative Example

The pellets from example 38 were processed on an extrusion plant (screw diameter $d_s$=90 mm, L/D=30, grooved bush with thermal isolation, spiral-groove distributor, vacuum spray tank calibration), to give pipes of dimensions 800×45.3 mm (external diameter $d_a$=800 mm, wall thickness s=45.3 mm). The weight throughput was from 380 to 410 kg/h, depending on the take-off speed. The barrel temperatures were set so as to give a melt temperature of 215° C.

The processing was found to run very consistently. The pipes had a circular cross section. The dimensional limit for ovality to DIN 8077 was not exceeded.

Wall thickness was determined at six test points with sixty-degree separation around the pipe. For pipes of these dimensions to DIN 8077, the wall thickness has to be from s=45.0 to s=49.8 mm (the values given being averages measured on 3 pipes).

| Test point 1 | (top of pipe): | $s_1$ = 45.4 mm |
| Test point 2 | (sixty degrees distant from 1 clockwise): | $s_2$ = 47.3 mm |
| Test point 3 | (sixty degrees distant from 2 clockwise): | $s_3$ = 48.9 mm |
| Test point 4 | (sixty degrees distant from 3 clockwise): | $s_4$ = 49.6 mm |
| Test point 5 | (sixty degrees distant from 4 clockwise): | $s_5$ = 48.7 mm |
| Test point 6 | (sixty degrees distant from 5 clockwise): | $s_6$ = 46.9 mm |

Roughness was measured on the inner surface of the pipe, which was very rough:
The following values were found:

| a) | maximum isolated roughness depth | $R_{max}$: | 13.05 mm |
| b) | average roughness depth | $R_z$: | 9.72 mm |
| c) | arithmetic mean roughness | $R_a$: | 1.37 mm |
| d) | maximum roughness depth | $R_t$: | 13.73 mm |

The DIN 8078 long-term internal-hydrostatic-pressure test was carried out on the pipe:

| Test temperature | Test stress | Min. time to failure to DIN 8078 | Measured time to failure |
|---|---|---|---|
| 95° C. | 3.5 N/mm² | >1000 h | 1287 h |
| 120° C. | 3.0 N/mm² | >200 h | 274 h |

The results complied with the minimum times to failure required.

The pipe was also subjected to a flexural impact test to DIN 8078 at 15° C. and 23° C., using a nominal impact-pendulum energy of 15 J. The test specimens for this were taken from the pipe wall mechanically. The test specimens withstood the impact only at 23° C. The test at 15° C. was not passed. The energy absorbed was 83 kJ/m² at 23° C., 58 kJ/m² at 15° C.

Example 41

Comparative Example

Preparation of a High-Molecular-Weight Propylene Homopolymer:

A 70 l vessel was carefully inertized and charged with 50 l of liquid propylene at 30° C. 100 mmol of triethylaluminum and 5 mmol of dicyclopentyldimethoxysilane were added, and the mixture was stirred for 15 minutes at 30° C. 376 mg of Montell FT4S M1 catalyst were then added, and in another step 11.9 Nl of hydrogen were added.

The contents of the vessel were heated to 70° C., with stirring. The polymerization began. The temperature was held constant at 70° C. for 48 minutes. The reactor contents were then worked up by depressurization, meaning that the unreacted propylene was removed by evaporation.

This gave 8.6 kg of a propylene homopolymer. The catalyst yield calculated from these data is 22.8 kg of propylene homopolymer/g of catalyst, i.e. titanium-containing solid component. The resultant propylene homopolymer had a melt flow rate MFR of 0.90 g/min and a cold-xylene-soluble fraction of 2.5% by weight.

Example 42

Comparative Example

The powder obtained from example 41 was pelletized at about 240° C. under an inert gas in a twin-screw extruder with a screw diameter of 53 mm. Stabilizers added here were 0.15% of Irganox® 1010 and 0.15% of Hostanox® PAR 24. Color pigments were also added in order to adjust the color to RAL 7032. 0.2% of ultrafine talc (product commercially available from Luzenac) was added as nucleating agent. The MFR 230/5 measured on the pellets was 0.97 g/10 min. DSC Onset was determined as 119±0.3° C.

Example 43

Comparative Example

Injection molding was used to produce tensile specimens from the pellets from example 42. A tensile test to ISO 527/1+2 to determine tensile modulus of elasticity was carried out on the tensile specimens. The value measured was s=1404 MPa. The toughness of the molding composition was determined via the Charpy notched impact strength to ISO 179/1 eA. The $a_{cn}$ value measured was 7.2 kJ/m$^2$. Both tests were carried out at 23° C.

Example 44

Comparative Example

The pellets from example 42 were processed on an extrusion plant (screw diameter $d_s$=90 mm, L/D=30, grooved bush with thermal isolation, spiral-groove distributor, vacuum spray tank calibration), to give pipes of dimensions 800×45.3 mm (external diameter $d_a$=800 mm, wall thickness s=45.3 mm). The weight throughput was from 380 to 410 kg/h, depending on the take-off speed. The barrel temperatures were set so as to give a melt temperature of 215° C.

It was impossible to produce pipes suitable for the subsequent application. The pipes were not circular with respect to external diameter, and the wall thickness distribution was not uniform. The pipes did not comply with the requirements of DIN 8077 in relation to the dimensional limits for the average external diameters and the ovalities, and the dimensional limits for the wall thicknesses. The inner surface of the pipes was very rough.

No long-term internal-hydrostatic-pressure test was carried out.

The pipe was also subjected to a flexural impact test to DIN 8078 at 23° C. and 15° C., using a nominal impact-pendulum energy of 15 J. The test specimens for this were taken from the pipe wall mechanically. The test was passed only at 23° C. The energy absorbed was 78 kJ/m$^2$ at 23° C., 53 kJ/m$^2$ at 15° C.

We claim:

1. A thick-walled pipe comprising a diameter of at least 500 mm and a wall thickness of at least 28.4 mm, wherein the thick-walled pipe comprises a molding composition, the molding composition comprising:
    a high-molecular-weight propylene polymer comprising a melt mass-flow rate MFR of from 0.3 to 1 g/10 min. at 230° C. and 5 kg a quinacridone pigment; and
    2 to 8% by weight of β modification crystallites.

2. The thick-walled pipe according to claim 1, wherein the molding composition comprises 4 to 8% by weight of the β modification crystallites.

3. The thick-walled pipe according to claim 1, wherein the molding composition comprises a melt mass-flow rate MFR of from 0.6 to 0.9 g/10 min. at 230° C. and 5 kg.

4. The thick-walled pipe according to claim 1, wherein the molding composition comprises a melt mass-flow rate MFR of from 0.75 to 0.9 g/10min. at 230° C. and 5 kg.

5. The thick-walled pipe according to claim 1, wherein the molding composition comprises a DSC crystallization onset above 122° C., according to ISO 11357-1.

6. The thick-walled pipe according to claim 1, wherein the molding composition comprises a DSC crystallization onset below 130° C., according to ISO 11357-1.

7. The thick-walled pipe according to claim 1, wherein the molding composition comprises a DSC crystallization onset ranging from 123 to 129° C., according to ISO 11357-1.

8. The thick-walled pipe according to claim 1, wherein the molding composition comprises a DSC crystallization onset ranging from 123 to 127° C., according to ISO 11357-1.

9. The thick-walled pipe according to claim 1 further comprising 0.001 to 0.5% by weight of a quinacridone pigment.

10. The thick-walled pipe according to claim 1 further comprising 0.002 to 0.2% by weight of a quinacridone pigment.

11. The thick-walled pipe according to claim 1 further comprising 0.002 to 0.1% by weight of a quinacridone pigment.

12. The thick-walled pipe according to claim 1 further comprising 0.001 to 0.5% by weight of a linear trans-gamma-quinacridone.

13. The thick-walled pipe according to claim 1 further comprising 0.002 to 0.2% by weight of a linear trans-gamma-quinacridone.

14. The thick-walled pipe according to claim 1 further comprising 0.002 to 0.1% by weight of a linear trans-gamma-quinacridone.

15. The thick-walled pipe according to claim 1, wherein the high-molecular-weight propylene polymer is a high-molecular-weight propylene homopolymer, high-molecular-weight propylene copolymer, or mixtures thereof.

16. The chick-walled pipe according to claim 15, wherein the high-molecular-weight propylene copolymer comprises up to 30% by weight of at least one $C_2$-$C_{10}$ olefin other than propylene.

17. The thick-walled pipe according to claim 15, wherein the high-molecular-weight propylene copolymer comprises up to 15% by weight of at least one $C_2$-$C_{10}$ olefin other than propylene.

18. The thick-walled pipe according to claim 15, wherein the high-molecular-weight propylene copolymer comprises up to 6% by weight of at least one $C_2$-$C_{10}$ olefin other than propylene.

19. The thick-walled pipe according to claim 15, wherein the high-molecular-weight propylene copolymer comprises up to 2% by weight of at least one $C_2$-$C_{10}$ olefin other than propylene.

20. The thick-walled pipe according to claim 15, wherein the high-molecular-weight propylene copolymer comprises at least one olefin selected from ethylene, 1-butene, 1-pentene, 1-hexene, 1-heptene, 1-octane, and mixtures thereof.

21. The thick-walled pipe according to claim 20, wherein the high-molecular-weight propylene copolymer comprises ethylene, 1-butene, or mixtures thereof.

22. A process for preparing a thick-walled pipe comprising a diameter of at least 500 mm and a wall thickness of at least 28.4 mm, wherein the thick-walled pipe comprises a molding composition, the molding composition comprising;

a high-molecular-weight propylene polymer comprising a melt mass-flow rate MER of from 0.3 to 1 g/10 min. at 230° C. and 5 kg;

a quinacridone pigment; and 2 to 8% by weight of βmodification crystallites;

the process comprising:

mixing the high-molecular-weight propylene polymer and the quinacridone pigment;

melting the high-molecular-weight propylene polymer and quinacridone pigment to form a quinacridone propylene polymer mixture; and extruding the quinacridone propylene polymer mixture.

23. The process according to claim 22, wherein the high-molecular-weight propylene polymer and the quinacridone pigment are mixed at a temperature ranging from 180 to 320° C.

24. The process according to claim 22, wherein the high-molecular-weight propylene polymer and the quinacridone pigment are mixed at a temperature ranging from 200 to 280° C.

25. The process according to claim 22, wherein the high-molecular-weight propylene polymer and the quinacridone pigment are mixed at a temperature ranging from 220 to 260° C.

* * * * *

UNITED STATES PATENT AND TRADEMARK OFFICE
CERTIFICATE OF CORRECTION

PATENT NO. : 7,521,104 B2 Page 1 of 1
APPLICATION NO. : 10/539343
DATED : April 21, 2009
INVENTOR(S) : Volker Dolle et al.

It is certified that error appears in the above-identified patent and that said Letters Patent is hereby corrected as shown below:

At col. 28, line 41, change "chick" to --thick--

Signed and Sealed this

Fourth Day of August, 2009

JOHN DOLL
*Acting Director of the United States Patent and Trademark Office*